United States Patent Office 3,175,916
Patented Mar. 30, 1965

3,175,916
PREPARING EDIBLE OILS FROM TALL OIL FATTY ACIDS
Biagio Costigliola, Toronto, Ontario, and Barton F. Teasdale, Islington, Ontario, Canada, assignors to Canada Packers Limited, Toronto, Ontario, Canada
No Drawing. Filed Dec. 11, 1961, Ser. No. 158,546
6 Claims. (Cl. 99—118)

This invention relates to the conversion of tall oil fatty acids into an edible triglyceride oil, and more particularly, relates to the production of a salad oil of good flavor stability and excellent cold test properties from tall oil fatty acids.

Crude tall oil, obtained as a by-product in the manufacture of kraft paper, is a dark, evil smelling liquid consisting essentially of a mixture of about 40–50% of rosin acids and about 50–60% of unsaturated fatty acids such as oleic and linoleic, together with minor proportions of unsaponified matter and various impurities. The rosin acids and the fatty acids are separated by fractional distillation. However, the fatty acids even after double distillation contain an appreciable amount, e.g., one to two percent of rosin acids.

There is a ready market for the rosin acids at a good price but while some uses for the tall oil fatty acids have been found in industrial applications such as the paint, varnish and soap industries, there is a growing surplus of these fatty acids as the demand for production of the rosin acids increases. The supply of tall oil fatty acids greatly exceeds the present demand and consequently they are commercially available in large quantities at a relatively low price. Despite this growing surplus, tall oil fatty acids have not previously been utilized for edible purposes. This is evidently due to the fact that the tall oil fatty acids and triglyceride products heretofore produced from such acids are associated with unpleasant odors, impurities, off-flavors, and instability to reversion or oxidation.

It is an object of the present invention, therefore, to produce a new and valuable product from tall oil fatty acids.

Another object of the invention is to provide a new and economical source of edible oils, at the same time alleviating the problems attendant and the surplusage of tall oil fatty acids.

Another object of the invention is to provide a process for conversion of tall oil fatty acids into edible triglycerides suitable for use as salad oils and other edible purposes.

A further object of the invention is to provide an edible oil of high smoke point and long cold test properties without the necessity of winterization.

Another object of the invention is to provide a process for preparation of triglycerides of tall oil fatty acids which are nonodorous and which have good flavor stability.

A still further object of the invention is to provide a method for esterifying tall oil fatty acids so as to produce a triglyceride oil having a relatively low free fatty acid content, low residual content of rosin acids, and which is substantially devoid of flavor and has good flavor stability.

These and other objects and advantages of the invention are accomplished, in general, by reacting approximately 3 mols of the fatty acids with 1 mol of glycerol in the presence of a specific esterification catalyst. The preferred catalyst for carrying out the esterification process is stannous sulphate. This catalyst appears to be unique in its ability to convert tall oil fatty acids into oils which are substantially devoid of characteristic flavors. Triglycerides of tall oil fatty acids may also be produced by utilizing inorganic compounds of tin or zinc, such as $SnCl_2.2H_2O$, $SnCl_4.5H_2O$, $ZnSO_4$, and $ZnCl_2$, as the catalysts. However, the products produced by utilizing such catalysts have, or develop on standing, a characteristic flavor. While they may still be satisfactory for edible purposes, their use may be limited to applications in which this flavor is overcome or tolerated. The flavor of the oils may be improved when they are subjected to slight hydrogenation and deodorizing operations known generally to improve vegetable oils. Other catalysts are generally less satisfactory, and some such as $\beta$-naphthalene sulphonic acid are completely unsatisfactory. Unexpectedly, the use of $SnSO_4$ as the esterification catalyst for treatment of the tall oil fatty acids produces a triglyceride oil from which the characteristic flavors are substantially absent and which retains its flavor stability over a substantial length of time.

The preferred temperature range for carrying out the esterification process with the tin and zinc catalysts is approximately 200° to 280° C. Below this temperature range the reaction proceeds too slowly while the use of higher temperatures results in a less satisfactory product. The preferred temperature within the range given is approximately 235° C. Generally, less than 0.5% of catalyst is required and about 0.17% is satisfactory.

The reaction is preferably carried out under an inert atmosphere and an inert gas such as nitrogen or carbon dioxide may be passed through or over the surface of the reaction mass to protect it against oxidation and carry off impurities. It has been found that the rosin acids are materially reduced by such operation, better than 90% of the residual rosin acid content of the tall oil fatty acids being carried off by the inert gas in this manner.

The reaction time after reaching the temperature range set forth is about 2½ to 6½ hours, the exact time being dependent somewhat on the temperature used in the specified range, as will be apparent to those skilled in the art. A time of 3 hours at 235° C. is satisfactory with the preferred $SnSO_4$ catalyst. The reaction product may then be refined by use of sodium hydroxide solution to remove residual free fatty acids, washing with water, bleaching with absorbent earth, and steam deodorizing in known manner. Antioxidants, such as $\alpha$-tocopherol, butylated hydroxyanisole, and the like may be incorporated in the deodorized product.

The blend of triglycerides produced by the process of the invention is a liquid oil similar in some respects to the salad oils of commerce produced from corn oils, soyabean oil and cottonseed oil, but having salad oil properties superior to such oils. Thus, it is desirable that salad oil have as small a quantity as possible of saturated fatty acids in the triglycerides of which it is composed, since triglycerides containing a perponderance of saturated fatty acids crystallize out at low temperatures. These crystals spoil the clarity or "sparkle" of the salad oil and, more importantly, the crystals cause the separation of the mayonnaise or salad dressing made with the oil. The triglyceride oils produced by the present invention show excellent clarity and sparkle and do not become cloudy even upon prolonged standing under refrigeration, i.e., they possess excellent cold test properties. They also have a high smoke point, which makes them valuable as cooking oils. Table I below provides a comparison of the composition of the oil produced by the present invention with typical cottonseed, soyabean and corn oils.

TABLE I

| Percent | | Tall Oil Fatty Acids | Cotton-seed Oil | Soya-bean Oil | Corn Oil |
|---|---|---|---|---|---|
| Myristic | $C_{14}$ | trace | 1.1 | | |
| Palmitic | $C_{16}$ | 1.5 | 26.8 | 11.0 | 12.3 |
| Palmitoleic | $C_{16}^=$ | 0.5 | 0.9 | | |
| Stearic | $C_{18}$ | 2.4 | 2.0 | 4.0 | 2.3 |
| Oleic | $C_{18}^=$ | 47.3 | 16.0 | 21.0 | 29.5 |
| Linoleic | $C_{18}^{2=}$ | 34.7 | 53.2 | 55.0 | 55.5 |
| Linolenic | $C_{18}^{3=}$ | | | 9.0 | |
| Arachidic | $C_{20}$ | 4.0 | | | |
| Eicosenoic | $\{C_{20}^=$ | 5.4 | | trace | 0.4 |
| | $\{C_{20}^{2=}$ | 4.2 | | | |

The above fatty acid compositions were determined by vapor phase chromatography.

Table II gives the triglyceride compositions for the same four oils.

TABLE II

| | Tall Oil[1] Triglycerides | Cottonseed Oil[2] | Soyabean Oil[2] | Corn Oil[2] |
|---|---|---|---|---|
| Tri-saturated | nil | 0.1 | nil | nil |
| Disaturated-monounsaturated | 1.8 | 13.2 | nil | 2.2 |
| Monosaturated-diunsaturated | 20.3 | 58.4 | 57.6 | 40.3 |
| Triunsaturated | 77.9 | 28.3 | 42.4 | 57.5 |

[1] Calculated from fatty acid composition.
[2] Vegetable Fats and Oils by E. W. Eckey, Reinhold Publishing Corporation (1954).

As Table I shows, the liquid oil made from tall oil fatty acids contains only 7.9% of saturated fatty acids, whereas cottonseed oil, soyabean oil and corn oil contain 29.9, 15.0 and 14.6%, respectively, of saturated fatty acids. The fatty acids of the tall oil product, in contrast to those of soyabean oil, contain substantially no linolenic acid and, therefore, are free of any serious tendency toward the flavor reversion encountered with soyabean oils. It should be noted, however, that the tall oil product is apparently substantially devoid of the antioxidants occurring in most natural oils which protect them from oxidative rancidity. The tall oil fatty acids being a highly fractionated product, seem to have been substantially stripped of any natural antioxidants that may have been originally present. However, this is overcome by the addition of antioxidants commercially available on the market.

From Table II it will be seen that all four oils are practically devoid of trisaturated triglycerides. Soyabean oil also has no disaturated triglycerides, while the tall oil triglycerides and the corn oil have very small amounts. The oil made from tall oil fatty acids has only 20.3% of monosaturated glycerides, about one-half the amount contained in corn oil, while all the rest have substantially more. It is, therefore, apparent that the tall oil product most nearly resembles corn oil, but is superior to all of the other oils for salad oil purposes. Cold tests (A.O.C.S. Method C(c)-11-53) confirm this, the oil made from the tall oil fatty acids having better cold test properties than the corn oil or the soyabean oil. Cottonseed oil customarily requires winterization to render it suitable for salad oil purposes.

The products of the present invention may best be described as an edible triglyceride oil containing over 70% of triunsaturated triglycerides, the fatty acid constituents of said oil being predominantly unsaturated fatty acids of at least 18 carbon atoms but having substantially no linolenic acid content, said oil having a good color, satisfactory flavor, smoke point of at least 440° F. and cold test of at least 100 hours at 0° C.

The following examples are set forth as illustrative of but not as limiting the invention:

*Example 1*

500 grams tall oil fatty acids, 58 gms. glycerol, and 0.9 gm. $SnCl_2.2H_2O$ (as catalyst) were stirred together in a three-necked glass flask under an atmosphere of nitrogen at 220° C. Thirty minutes were required to heat to 220° C. and the reaction was continued at this temperature for 6½ hours. The mixture was cooled to 90° C. and filtered. It had a free fatty acid (F.F.A.) content of 1.7%, which was removed by refining with 10 cc. of 16° Bé. sodium hydroxide solution. The refined oil was freed of soap by washing twice with water and then bleached with 2% of activated earth at 110° C. The analysis of the bleached oil was:

Color _____ 20Y 2.0R (Lovibond 5¼").
F.F.A. _____ 0.1%.

The oil was then steam deodorized in a laboratory deodorizer for 2½ hours at 250° C. and 1 mm. absolute pressure. It was then cooled to 60° C. before the vacuum was broken. The deodorized product had the following properties:

Color _____ 1.8R.
F.F.A _____ 0.05%.
Monoglyceride _____ 1.7%.
Diglyceride _____ Nil.
Smoke point _____ 445° F.
Cold test _____ Indefinitely long at 0° C. 10 days at −10° C.
Flavor _____ Nutty, pleasant after 1 day at room temperature.

*Example 2*

500 grams tall oil fatty acids, 58 gms. glycerol and 0.9 gm. $SnCl_2.2H_2O$ were stirred together in a three-necked flask under nitrogen. One hour was required to heat the mixture to 220° C. and it was held at this temperature for four hours before cooling to 70° C. The 0.9% F.F.A. of the reaction product was removed by refining with 1.5% of 16° Bé. sodium hydroxide. The oil was freed of soap by water washing and then it was bleached with 3% of activated earth. The analysis of the bleached oil was:

Color _____ 18Y 1.8R (Lovibond 5¼").
F.F.A. _____ 0.1%.

The bleached oil was deodorized for 3 hours at 250–255° C. under an absolute pressure of 1 mm. The vacuum was broken with nitrogen. The product had the following characteristics:

Color _____ 15Y 1.5R.
F.F.A. _____ 0.05%.
Smoke point _____ 445°F.
Cold test _____ Indefinitely long at 0° C.
Flavor _____ Slightly nutty after 2 days at room temperature.

*Example 3*

1330 grams tall oil fatty acids (containing 1.1% of rosin acids), 164 gms. of 95% glycerol and 2.3 gms. $SnCl_2.2H_2O$ were agitated together in a three-necked flask under a stream of nitrogen at 235° C. The nitrogen stream escaping from the flask was passed over a cold water condenser. A white, waxy substance was deposited on the condenser. After 5 hours' reaction, the mixture was cooled and filtered. The reaction product contained 0.9% of F.F.A. and 0.06% of rosin acids. The waxy substance deposited on the condenser had a rosin acid content of 95%. The reaction product was refined, water washed, bleached and deodorized as in Examples 1 and 2 above. It exhibited substantially the same properties as given in Examples 1 and 2.

*Example 4*

446.5 grams of distilled tall oil fatty acids, 53.5 gms. glycerol and 0.85 gm. $SnSO_4$ (0.17%) were agitated together at 235° C. in a three-necked flask for 3 hours under an atmosphere of nitrogen. The fatty acids, glycerol and catalyst were stirred together during the reaction period and a stream of nitrogen was passed over the mixture. After one hour, the F.F.A. content of the reaction mass was determined to be 7.1%; after two hours, 3.1%; and at the end of the three-hour reaction time, 0.8%. The rosin acid content was reduced to less than about 0.1%. After cooling the contents of the flask to 40° C., the free fatty acids were removed by refining with 3.6% of 16% Bé. NaOH (A.O.C.S. official Method C.A.9A.52), and the oil was then bleached at 110° to 120° C. with 1% bleaching earth, followed by filtration. The bleached oil was steam deodorized under vacuum for two hours at 252° C. The product oil had an excellent color, no detectable odor or flavor and, as will be illustrated below, had a cold test of over 100 hours. Its flavor stability was quite satisfactory.

In order further to compare the effect of the catalyst on the process of the present invention, a series of tests were conducted utilizing, in general, the same procedure. Thus, the fatty acids and glycerol and the catalyst were stirred together in a 3-necked flask under a stream of nitrogen. Caustic refining was conducted on all of the synthesized triglycerides following the A.O.C.S. official Method C.A.9A.52. For bleaching, the oils were heated to 110° to 120° C. with agitation, 1% bleaching earth and filter cell were added, and after 10 minutes of contact the fats were filtered. Steam deodorization under vacuum was performed for two hours at 252° C. on all of the samples. The tall oil fatty acids used for the esterification in each instance had a free fatty acid content (as oleic) of better than 98%. The results of these tests are set forth in the following table:

In order further to illustrate the invention, an oil produced by esterifying a sample of tall oil fatty acids with $SnCl_2 \cdot 2H_2O$ as the catalyst, was slightly hydrogenated, after refinement, by treating with hydrogen for thirty minutes at a temperature of 375° F. and a pressure of 5 p.s.i. in the presence of a hydrogenation catalyst. The refractive index of the oil was reduced from an initial 1.4621 to 1.4615. The other operations (bleaching and deodorizing) were then performed in the previously described manner. The sample, after deodorization, was bottled under nitrogen with the addition of 0.035% of "Tenox-7," an antioxidant of the butylated hydroxyanisole type.

The same operations, except for hydrogenation, were carried out on another sample of the same lot of tall oil fatty acids but with the use of $SnSO_4$ as esterification catalyst. To the deodorized oil 0.035% of α-tocopherol as well as 0.035% of Tenox-7 were added. Tests on the oils produced by the two procedures are given in Table IV below.

TABLE IV

| Catalyst | I.V. Before Hydrog. | I.V. After Hydrog. | Color | FFA | Initial Flavor | Cold Test, Hrs. | AOM, Hrs. | Flavor After— |
|---|---|---|---|---|---|---|---|---|
| $SnCl_2 \cdot 2H_2O$ | 114.8 | 110.2 | 22Y 3.2R | 0.04 | Good– | 1 | | 24 hrs. good. |
| $SnSO_4$ | 116.4 | | 20Y 2.0R | 0.02 | Good– | >100 | 36 | 24 hrs. good. 1 week good. 6 weeks good. |

It will be seen from Table IV that the oil produced by hydrogenating the sample produced by the $SnCl_2 \cdot 2H_2O$ catalyst as well as the oil produced by the $SnSO_4$ catalyst without hydrogenation, both had a good initial flavor, the so-called "piney flavor" having been eliminated. However, the hydrogenation operation drastically reduced the cold test, the hydrogenated product showing a cold test of only one hour as compared to over 100 hours for the oil from the $SnSO_4$ catalytic operation. Further, in addition to having a good initial flavor, the flavor stability of the $SnSO_4$ product was better than that of the hydrogenated oil. The cold test for the $SnSO_4$-produced oil is believed to be superior to the salad oils now on the market, many of which have passed through expensive winterization procedures.

It will be understood, of course, in instances where it appears desirable, the $SnSO_4$-produced oil might be hydrogenated to change its characteristics for other commercial purposes than salad oils. Likewise, hydrogenation and subsequent winterization may be practiced on the various tall oil products.

It will be understood that various modifications of the

TABLE III

| Catalyst | Temp., °C. | Color | Percent Free Fatty Acids | Flavor | I.V. | Time Reaction, Hrs. | Percent FFA Final Reaction |
|---|---|---|---|---|---|---|---|
| $SnCl_2 \cdot 2H_2O$ | 280 | 35Y 2.8R | 0.02 | Slightly piney | 114.0 | 3 | 2.1 |
| $SnCl_2 \cdot 2H_2O$ | 250 | 35Y 6.1R | 0.01 | Piney | 120.2 | 4 | 2.0 |
| $SnCl_2 \cdot 2H_2O$ | 200 | 35Y 2.1R | 0.07 | do | 116.6 | 6 | 4.9 |
| $SnCl_4 \cdot 5H_2O$ | 235 | 35Y 4.2R | 0.03 | do | 117.3 | 4 | 2.4 |
| $SnSO_4$ | 235 | 20Y 2.2R | 0.14 | Good | 115.9 | 3 | 0.8 |
| $ZnCl_2$ | 235 | 35Y 3.8R | 0.03 | Piney | 116.9 | 4 | 1.8 |
| β-Naphthalene sulfonic acid | 235 | | | | | 4 | 10.3 |

The reaction using β-naphthalene sulfonic acid, decomposed after two hours into a dark liquid having an irritating smell and this product was discarded.

It will be readily apparent from Table III that the $SnSO_4$ catalyst was quite superior to the other catalysts. Thus, after three hours of reaction, the free fatty acid content was only 0.8%. Also, the product obtained as a result of using this catalyst did not develop the characteristic flavor exhibited by the other oils.

refining, bleaching and deodorizing operations may be utilized, and that the product oil may be blended with other oils, without departing from the scope of the invention as set forth.

We claim:
1. A process for the conversion of tall oil fatty acids into edible triglycerides comprising esterifying tall oil fatty acids with glycerol in the presence of a catalytic quantity of $SnSO_4$ at a temperature in the range of about

200° to 280° C. for a time of about 2½ to 6½ hours, the molar proportion of fatty acids and glycerol in the reaction mixture being approximately 3 to 1.

2. The process of claim 1 wherein the esterification reaction is carried out while passing an inert gas in contact with the reaction mass to carry off impurities and protect the reaction mixture from oxidation.

3. The process of claim 1 wherein the triglycerides produced by said esterification are refined, bleached and deodorized.

4. The process of claim 3 including the addition of edible antioxidants to the deodorized product.

5. A process for the conversion of tall oil fatty acids into edible triglycerides comprising reacting approximately 3 mols of said tall oil fatty acids with 1 mol of glycerol in the presence of about 0.17% of $SnSO_4$ at a temperature of approximately 235° C. for a time of about three hours.

6. A process for the conversion of tall oil fatty acids into edible triglycerides comprising esterfying tall oil fatty acids with glycerol in a molar proportion of approximately 3 mols of the fatty acids to 1 mol of glycerol in the presence of a catalytic quantity of $SnSO_4$ at a temperature of about 200° to 280° C. for a time of about 2½ to 6½ hours while maintaining the reactants under a stream of nitrogen, refining the resulting triglycerides with caustic, bleaching said triglycerides with bleaching earth and deodorizing said triglycerides with steam.

References Cited in the file of this patent

UNITED STATES PATENTS

| | | |
|---|---|---|
| 2,628,967 | Voegeli | Feb. 17, 1953 |
| 2,759,954 | Miller | Aug. 21, 1956 |
| 2,808,336 | Kolish | Oct. 1, 1957 |
| 2,815,295 | Forsythe | Dec. 3, 1957 |
| 2,872,465 | Sims et al. | Feb. 3, 1959 |

OTHER REFERENCES

Dunlap et al.: J. American Oil Chemist's Society, October 1950, 27, No. 10, pp. 361–366.
Chemical Abstracts, 53, 1959, p. 9668d.
Chemical Abstracts 55, 1961, page 26292f.